United States Patent
Gäng et al.

(10) Patent No.: US 12,043,291 B2
(45) Date of Patent: Jul. 23, 2024

(54) METHOD AND DEVICE FOR ASSISTING A DRIVER OF A VEHICLE

(71) Applicant: DAIMLER AG, Stuttgart (DE)

(72) Inventors: Christoph Gäng, Stuttgart (DE); Maria Hirsch, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 472 days.

(21) Appl. No.: 17/429,158

(22) PCT Filed: Feb. 4, 2020

(86) PCT No.: PCT/EP2020/052756
§ 371 (c)(1),
(2) Date: Aug. 6, 2021

(87) PCT Pub. No.: WO2020/161137
PCT Pub. Date: Aug. 13, 2020

(65) Prior Publication Data
US 2022/0032963 A1 Feb. 3, 2022

(30) Foreign Application Priority Data

Feb. 7, 2019 (DE) .................... 10 2019 000 899.5

(51) Int. Cl.
*B60W 60/00* (2020.01)
*B60W 50/08* (2020.01)
(Continued)

(52) U.S. Cl.
CPC ...... *B60W 60/0051* (2020.02); *B60W 50/082* (2013.01); *B60W 50/14* (2013.01);
(Continued)

(58) Field of Classification Search
CPC .......... B60W 60/0051; B60W 50/082; B60W 50/14; B60W 2540/215; B60W 2556/45;
(Continued)

(56) References Cited

U.S. PATENT DOCUMENTS

| 8,818,608 B2 * | 8/2014 | Cullinane | ........... B60W 50/082 701/96 |
| 9,075,413 B2 * | 7/2015 | Cullinane | ......... B60W 60/0051 |

(Continued)

FOREIGN PATENT DOCUMENTS

| CN | 103171439 A | 6/2013 |
| CN | 104822573 A | 8/2015 |

(Continued)

OTHER PUBLICATIONS

"Displaying the Driving State of Automated Vehicles to Other Road Users: An International, Virtual Reality-Based Study as a First Step for the Harmonized Regulations of Novel Signaling Devices Timo Singer, Jonas Kobbert, Babak Zandi, and Tran Quoc Khanh" (Year: 2022).*

(Continued)

*Primary Examiner* — Gertrude Arthur Jeanglaude
(74) *Attorney, Agent, or Firm* — PATENT PORTFOLIO BUILDERS PLLC

(57) ABSTRACT

A method for assisting a driver in activating an automatic driving mode of a vehicle involves determining the conditions required for an autonomous driving mode and determining a condition not fulfilled in the current driving state which blocks an activation of the autonomous driving mode. An object in the vehicle environment that is in context with an unfulfilled condition is also determined. The object in context with the unfulfilled condition is identified in a representation of the vehicle environment or by projection (Continued)

Figure 1:
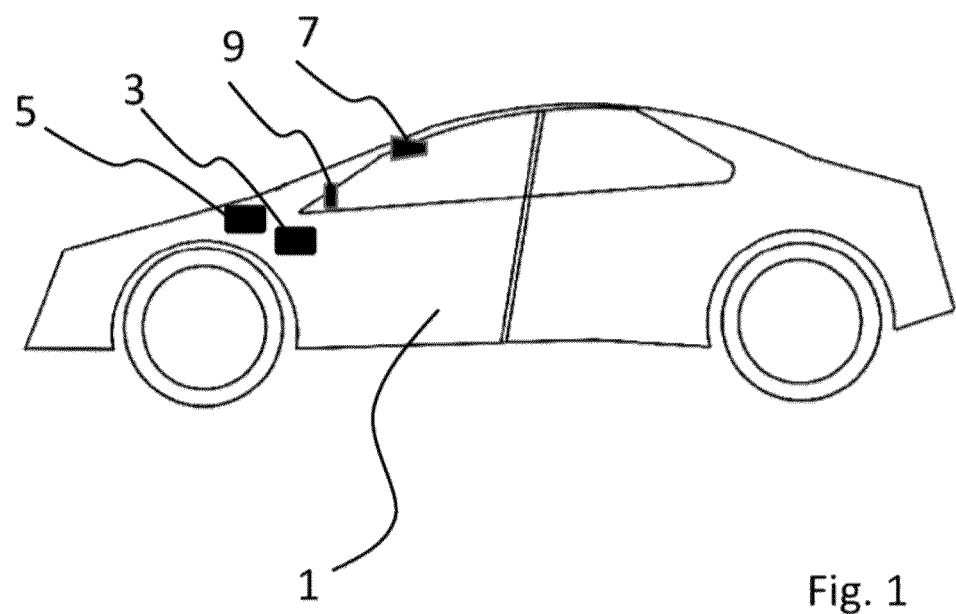

onto a windscreen, such that a driving maneuver required for enabling an autonomous driving operation is conveyed.

8 Claims, 3 Drawing Sheets

(51) Int. Cl.
  *B60W 50/14* (2020.01)
  *B60K 35/00* (2006.01)
  *B60K 35/23* (2024.01)
  *B60K 35/28* (2024.01)
  *G05D 1/00* (2006.01)

(52) U.S. Cl.
  CPC .............. *B60K 35/00* (2013.01); *B60K 35/23* (2024.01); *B60K 35/28* (2024.01); *B60K 2360/161* (2024.01); *B60K 2360/175* (2024.01); *B60W 2050/146* (2013.01); *B60W 2540/215* (2020.02); *B60W 2556/45* (2020.02); *G05D 1/0295* (2013.01)

(58) Field of Classification Search
  CPC ..... B60W 2050/146; B60K 2370/1529; B60K 2370/161; B60K 2370/175; B60K 35/00; G05D 1/0295
  See application file for complete search history.

(56) References Cited

U.S. PATENT DOCUMENTS

| | | | |
|---|---|---|---|
| 9,669,871 B2 * | 6/2017 | Kuoch | B60K 35/00 |
| 9,694,681 B2 | 7/2017 | Kleen et al. | |
| 9,772,626 B2 | 9/2017 | Bendewald et al. | |
| 10,322,717 B2 | 6/2019 | Rust | |
| 11,624,628 B2 | 4/2023 | Nemec et al. | |
| 11,643,099 B2 | 5/2023 | Cullinane et al. | |
| 2014/0156133 A1 * | 6/2014 | Cullinane | B60W 30/00 |
| | | | 701/23 |
| 2016/0159280 A1 | 6/2016 | Takazawa et al. | |
| 2016/0314224 A1 * | 10/2016 | Wei | G06F 30/20 |
| 2017/0243504 A1 | 8/2017 | Hada | |
| 2018/0024354 A1 | 1/2018 | Shibata et al. | |
| 2018/0281818 A1 | 10/2018 | Ebina et al. | |
| 2018/0284759 A1 | 10/2018 | Michalakis et al. | |
| 2019/0018410 A1 | 1/2019 | Ando | |
| 2019/0094856 A1 * | 3/2019 | Kawate | B60W 50/082 |

FOREIGN PATENT DOCUMENTS

| | | |
|---|---|---|
| CN | 104837705 A | 8/2015 |
| CN | 107835932 A | 3/2018 |
| CN | 108791307 A | 11/2018 |
| DE | 102013110852 A1 | 4/2015 |
| DE | 102013110909 A1 | 4/2015 |
| DE | 102017130936 A1 | 7/2018 |
| DE | 102017212222 B3 | 10/2018 |
| EP | 3351418 A1 | 7/2018 |
| WO | 2018074586 A1 | 4/2018 |

OTHER PUBLICATIONS

International Search Report mailed Jun. 5, 2020 in related/corresponding International Application No. PCT/EP2020/052756.
Office Action created Jul. 11, 2019 in related/corresponding DE Application No. 10 2019 000 899.5.
Written Opinion mailed Jun. 5, 2020 in related/corresponding International Application No. PCT/EP2020/052756.
Office Action dated Nov. 9, 2023 in related/corresponding CN Application No. 202080012858.3.

* cited by examiner

METHOD AND DEVICE FOR ASSISTING A DRIVER OF A VEHICLE

BACKGROUND AND SUMMARY OF THE INVENTION

Exemplary embodiments of the invention relate to a method and a device for assisting a driver in activating an automatic driving mode of a vehicle.

Autonomous driving vehicles are known, wherein predetermined conditions must be fulfilled for an autonomous driving mode.

DE 10 2013 110 909 A1 discloses a device configured to detect an autonomous driving state of a vehicle and to display a plurality of conditions to be met in the automatic driving state for maintaining the state. If the automatic driving state is disabled, then the unfulfilled conditions are displayed to the driver.

According to the prior art, a driver can see which conditions are no longer fulfilled when an autonomous driving state is terminated, but he/she does not receive any information about how the objects related to the unfulfilled conditions are located in the vehicle environment.

DE 10 2017 212 222 B3 discloses a method in which a safety indicator which indicates the reliability of the currently operated driving mode is used. By means of the safety indicator, the user can recognize how reliably the driver assistance system is performing the operated driving mode.

DE 10 2017 130 936 A1 discloses a method for controlling an autonomous vehicle in which it is determined whether assistance from manual instructions from a remote user is required to move the autonomous vehicle. A display screen depicts a vehicle along with an obstacle and an initial path. In one embodiment, the screen display can include a revised path for the vehicle.

US 2018/0 281 818 A1 discloses an information output device that offers a driving maneuver of an autonomously driving vehicle to a vehicle user for selection. It is hereby indicated to the user how much time is left to select the driving maneuver. In contrast, exemplary embodiments involve a determination and identification of an object that is a prerequisite for the automatic driving operation in the context of a condition to be fulfilled.

DE 10 2013 110 852 A1 discloses a driving assistance system in which a start of an autopilot route section is determined in a route course planned for the vehicle. In the output, a future route course to a vehicle driving ahead is displayed. The route course is divided into a first part up to the beginning of the autopilot route section and a second part representing the autopilot route section.

In contrast, exemplary embodiments of the invention are directed to a method and a device by means of which an easy change from a manual to an autonomous driving mode is enabled.

In the method according to the invention, an object in the vehicle environment that is in the context of fulfilling an unfulfilled condition is identified and marked in a representation of the vehicle environment or by a projection of a graphic onto a windscreen, such that the driver is provided with a driving maneuver required for activating an autonomous driving mode.

With the marking of the object and a graphic representation in a vehicle environment, the driver receives an indication of the direction in which the object is located relative to his/her vehicle. As an alternative to the graphical representation, a marking is superimposed on the real object of the environment on the windscreen by means of a projector. This makes it possible to see which driving maneuver has to be performed in order to enable autonomous driving. By way of example, a driver recognizes in which direction he/she must steer the vehicle and whether he/she must accelerate or decelerate in order to achieve that the condition for autonomous driving is fulfilled. The marked object is thus in the context of a condition that the driver can influence on his/her own initiative by actively changing the vehicle position such that the condition is fulfilled or not. In an additional embodiment, a driving direction arrow is displayed for the marked object. In an activated autonomous driving mode, the vehicle drives at least partially autonomously. The autonomous driving mode is enabled as soon as all conditions are fulfilled; the activation occurs either at the request of a user or automatically. The representation of the vehicle environment comprising the object in context with the unfulfilled conditions is, for example, a graphical representation or a video image of the environment, which is depicted, for example, on a display such as the instrument cluster or a central display. In an alternative, the marking is projected onto the windscreen with a head-up display, for example, and displayed superimposed onto the real environment. The conditions required for the autonomous driving mode are read out from a control device or transmitted to the vehicle via wireless connection such as WLAN or mobile radio. An object in the vehicle's environment that is in context with a condition that has not been fulfilled is detected using an environment sensor system such as a camera, radar or lidar.

By way of example, the marking can comprise color highlighting, brightening, animating, a symbol, a directional arrow, an indication, and/or some other graphic addition to the object.

According to the invention, the object in the context of fulfilling the unfulfilled condition comprises a vehicle driving in the vehicle environment and suitable as a lead vehicle. In an autonomous driving mode requiring a lead vehicle, a driver must catch up with such a vehicle in order to activate the autonomous driving mode or to unblock the autonomous driving mode. A potential lead vehicle driving in the vicinity of the vehicle is determined and displayed and marked in a representation of the vehicle's surroundings; alternatively, a marking is displayed on a windscreen superimposed on the potential lead vehicle. In an advantageous manner, the driver receives information about the direction in which he/she must steer his/her vehicle and how far he/she must close the gap in order to be able to use an autonomous driving mode.

In further additional or alternative embodiments of the method, the object in context with the object used to fulfil the unfulfilled conditions comprises a lane approved for autonomous driving. Depending on the country and legal provisions, lanes intended for autonomous driving may be provided. If the vehicle drives next to the lane approved for autonomous driving, the autonomous driving function is disabled. The approved lane is determined and in turn displayed and marked in a representation of the vehicle environment; alternatively, a marking of the approved lane is displayed superimposed on a windscreen. The vehicle user can thus recognize in which direction his/her vehicle is to be steered in order to unblock the autonomous driving mode.

In a modified embodiment, the conditions for autonomous driving are determined based on the location. By way of example, the conditions for autonomous driving are dependent on the country. The location is used to determine which country the vehicle is travelling through and which provision is prescribed. This advantageously enables a country-dependent determination of the object in context with the unfulfilled condition.

In a further design of the method, the conditions for autonomous driving are continuously scanned via a server. The conditions depend on the respective legal and regional regulations and are subject to frequent changes. A continuous update of the applicable conditions ensures reliable operation of the method according to the invention.

In a further design of the invention, the objects in the context of the unfulfilled conditions are displayed before requesting an activation of an autonomous driving mode. By way of example, the objects related to a missing condition for an autonomous driving mode can continuously be displayed to the driver. This makes it possible to maneuver the vehicle into a driving position in which an autonomous driving mode is enabled. If autonomous driving operation is enabled, a user can activate autonomous driving by request. Advantageously, it is avoided that a request is blocked due to unfulfilled conditions and that the driver, in addition to a rejection of his/her request, does not receive any indication of which maneuver is to be performed to remove the block.

In another embodiment, the graphical representation comprises a real image of the environment. The real image of the environment is captured by a camera, for example, and presented in a display. In the depicted real image, a marking is assigned to or superimposed on the object that is in context with the unfulfilled conditions. In an advantageous manner, the real image enables easy recognition of the object in the environment.

In a further design of the method, the vehicle in question is at least partially depicted in the depiction of the environment. In an advantageous manner, a driver can more easily recognize the position of his/her own vehicle with regard to the object in context with the unfulfilled conditions.

The device according to the invention comprises a device that determines an object in the vehicle environment that is in context with a condition that is not fulfilled, and a display unit that, in order to convey a driving maneuver required for enabling an autonomous driving mode, identifies an object in context with the unfulfilled conditions in a representation of the vehicle environment or by projection onto a windscreen. In an advantageous manner, a driver can easily identify the direction in which he/she must steer his/her vehicle to cause autonomous driving to be enabled.

Further advantages, features and details emerge from the following description, in which—possibly with reference to the drawing—at least one exemplary embodiment is described in detail. Described and/or illustrated features can form the subject matter of the invention individually or in any useful combination, optionally also independently of the claims, and can in particular also be the subject matter of one or more separate application(s). Identical, similar or functionally identical parts are provided with identical reference numerals.

BRIEF DESCRIPTION OF THE DRAWING FIGURES

Here are shown:
FIG. 1 a vehicle having a device according to the invention,
FIG. 2 a representation of a vehicle environment and identification of an object in context with an unfulfilled condition for autonomous driving,
FIG. 3 a further representation of a vehicle environment and identification of a further object in context with an unfulfilled condition for autonomous driving, and
FIG. 4 a flow chart for activating an automatic driving mode.

DETAILED DESCRIPTION

FIG. 1 shows a vehicle 1 set up to carry out the method according to the invention. The vehicle comprises a computing unit 3 for determining the conditions required for an autonomous driving mode. A device 5 determines the conditions not fulfilled for an autonomous driving mode. For this purpose, a vehicle sensor system such as a camera 7 provides information to the device 5 about the environment of the vehicle 1. From the information provided by the camera, the device 5 determines objects in the environment that are in context with the unfulfilled conditions. On a display unit 9, these objects are displayed and identified to a driver in an assistance graphic. The device for determining conditions that are not fulfilled in the current driving state and the device for determining objects in the vehicle environment that are in context with conditions that are not fulfilled can be integrated in one control unit or distributed over several control units.

Figure 2:
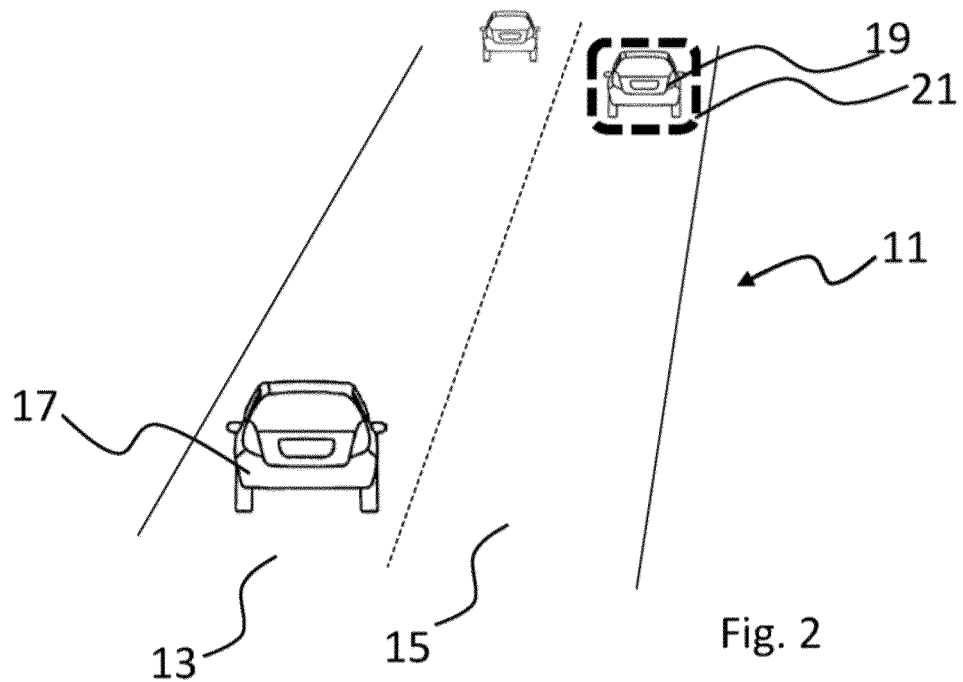

FIG. 2 shows an assistance graphic of a representation shown on the display unit 9. The representation comprises a vehicle environment 11 of the vehicle in question. The vehicle environment includes a driving path ahead having first and second lanes 13, 15.

The representation further comprises an image of the vehicle in question 17 and another vehicle 19 driving in the vehicle environment and suitable as a lead vehicle for autonomous driving operation. The suitability of the vehicle 19 as a lead vehicle is indicated by the marking 21. By means of the representation, the driver of the vehicle in question can recognize the position of his/her vehicle relative to a potential lead vehicle and initiate a driving maneuver that causes an autonomous driving mode to be enabled. The required driving maneuver includes changing lane and catching up with the vehicle 19.

Figure 3:
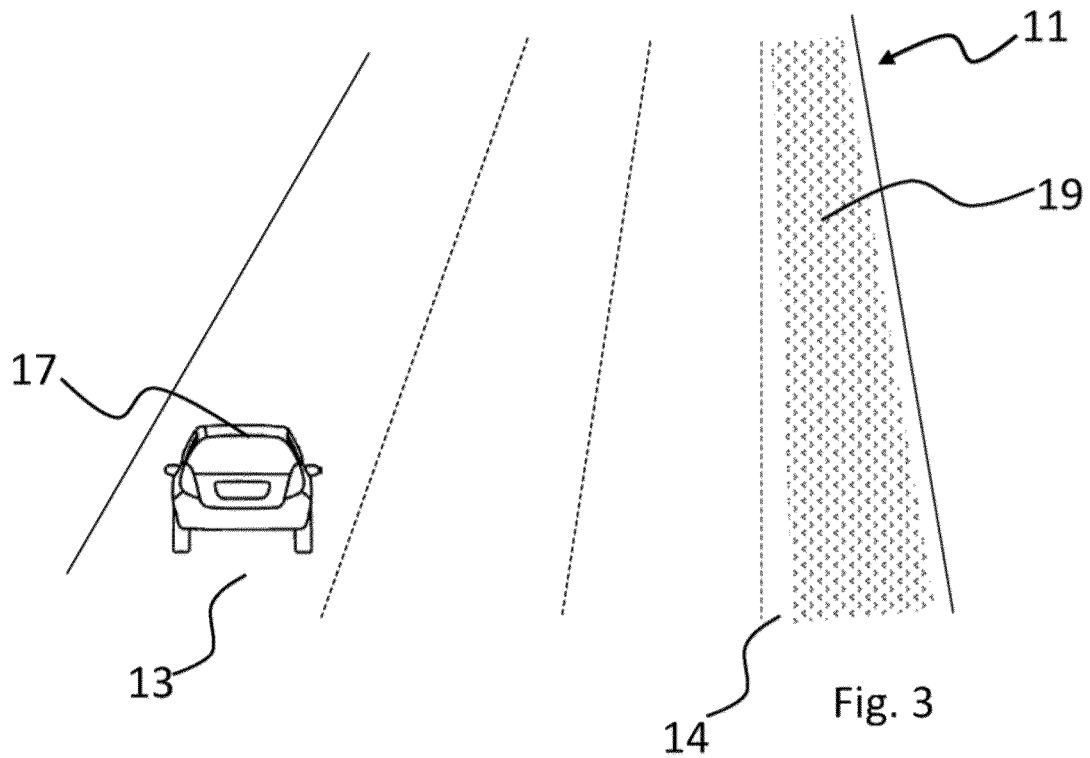

FIG. 3 shows the assistance graphic with a further representation which comprises an upcoming multi-lane driving route. The vehicle 17 in question, depicted as an image in the assistance graphic, is driving in the left-hand lane 13. However, only one lane 14 is enabled for an autonomous driving mode; the autonomous driving mode is correspondingly disabled in the vehicle in question and is not activated despite a request by the driver. The driver is shown the object in the context of the unfulfilled condition, i.e., the lane enabled for an autonomous driving mode, by a marking 19 carried out as a hatching. The marking indicates to the driver which driving maneuver has to be performed in order to cause the autonomous driving mode to be enabled. The maneuver includes changing from the lane 13 to the lane 14.

Figure 4:
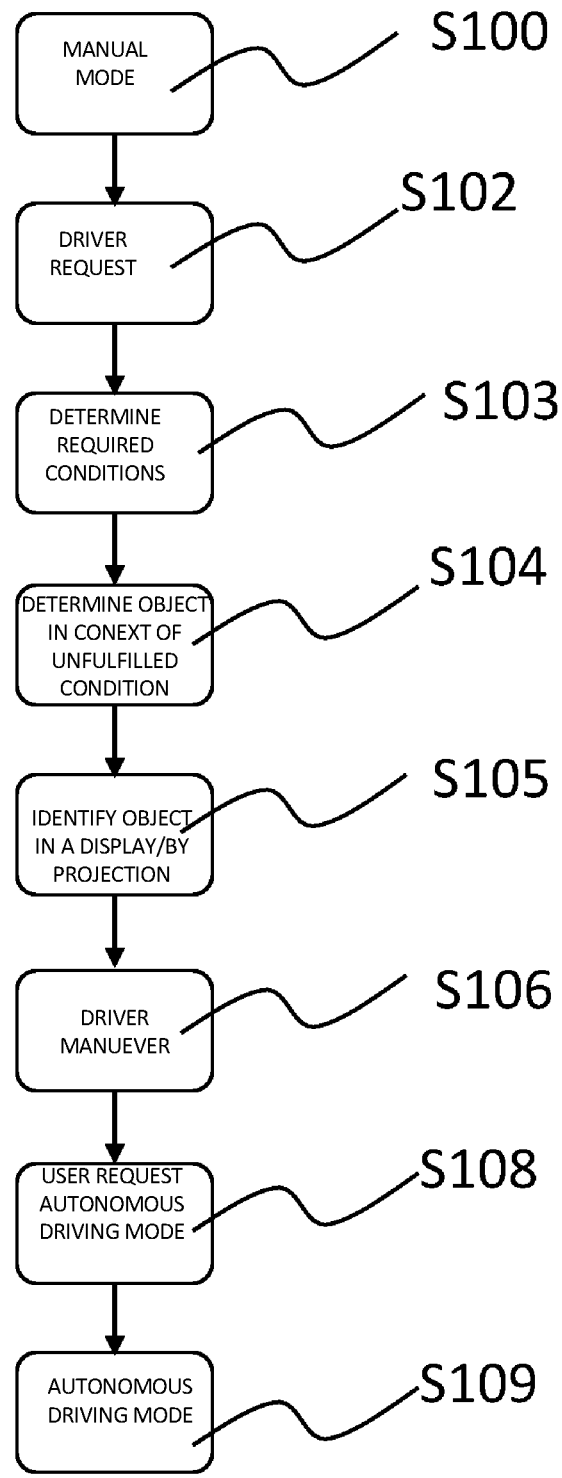

FIG. 4 shows a flowchart for activating an autonomous driving mode. In step S100, a vehicle is driving in the manual mode. With the desire to be able to drive autonomously, the driver requests the display of an assistance graphic in step S102. The assistance graphic corresponding to, for example, one of FIGS. 2 and 3 is displayed on a display device 9 in the vehicle.

With a request of the assistance graphic, the required conditions and the conditions blocking an autonomous driving mode are determined, S103. According to step S104, an object in the context of the unfulfilled condition is determined in the vehicle environment.

According to step S105, the object in the context of the unfulfilled condition is identified in a display of the vehicle environment or by projecting information superimposed on or associated with the object onto a windscreen.

From the representation in the display device or the projected information, the unfulfilled conditions for autonomous driving as well as the objects in the context of the conditions are already apparent in the manual driving mode. From the marking of the objects, a driver can recognize in a logical way which driving maneuver has to be performed in order to cause autonomous driving to be enabled. The marking can already comprise a mere representation of the object, a highlighting and/or an indication, for example as an image or in text form, of the object or of the condition that is in context with the object. In addition, a driving direction recommendation such as a trajectory towards the object can be displayed as further assistance.

In step 106, the driver performs a driving maneuver related to the object, i.e., he/she changes to the lane 14 approved for the autonomous driving mode, for example. The assistance graphic then shows the particular vehicle driving in lane 14, in deviation from FIG. 2. By driving in lane 14, the autonomous driving mode is enabled on the vehicle side, i.e., it can be activated at the user's request.

In step 108, the user requests the autonomous driving mode by pressing a button, for example. Since all conditions are now fulfilled, the vehicle starts autonomous driving in step S109.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for assisting a driver in activating an autonomous driving mode of a vehicle, the method comprising:
   determining conditions required for the autonomous driving mode;
   determining, based on the determined conditions required for the autonomous driving mode, unfulfilled conditions in a current driving state and that prevent activation of the autonomous driving mode;
   determining an object in an environment of the vehicle relating to at least one unfulfilled condition of the unfulfilled conditions;
   identifying the determined object in a representation of the vehicle environment or by projection onto a windscreen of the vehicle such that a driving maneuver required for enabling an autonomous driving mode is communicated to the driver, wherein the object relating to the at least one unfulfilled condition comprises a vehicle driving in the environment of the vehicle and suitable as a lead vehicle.

2. The method of claim 1, wherein the object in the environment of the vehicle relating to at least one unfulfilled condition of the unfulfilled conditions is a lane approved for autonomous driving.

3. The method of claim 1, wherein the conditions required for the autonomous driving mode are determined depending on the location.

4. The method of claim 1, wherein the conditions required for the autonomous driving mode are continuously scanned via a server.

5. The method of claim 1, wherein the object in the environment of the vehicle relating to at least one unfulfilled condition of the unfulfilled conditions is displayed by the representation of the vehicle environment or by the projection onto the windscreen of the vehicle before requesting an activation of the autonomous driving mode.

6. The method of claim 1, wherein the representation of the vehicle environment comprises a real image of the environment.

7. The method of claim 1, wherein the vehicle is at least partially represented in the representation of the vehicle environment.

8. A device assisting a driver in activating an autonomous driving mode of a vehicle, the device comprising:
   a display unit;
   a computing unit that determines conditions required for the autonomous driving mode; and
   a device configured to determine, based on the determined conditions required for the autonomous driving mode, unfulfilled conditions in a current driving state and that prevent activation of the autonomous driving mode, wherein the device is further configured to an object in an environment of the vehicle relating to at least one unfulfilled condition of the unfulfilled conditions, and wherein the device is further configured to communicate a driving maneuver required for enabling the autonomous driving mode to the display unit; and
   wherein the display unit identifies the determined object in a representation of the vehicle environment or by projection onto a windscreen of the vehicle such that the driving maneuver required for enabling an autonomous driving mode is communicated to the driver, wherein the object relating to the at least one unfulfilled condition comprises a vehicle driving in the environment of the vehicle and suitable as a lead vehicle.

\* \* \* \* \*